(12) United States Patent
Eick et al.

(10) Patent No.: US 8,342,288 B2
(45) Date of Patent: Jan. 1, 2013

(54) SEISMIC TRANSDUCERS HAVING REDUCED SURFACE AREA BASEPLATES AND METHODS OF USE

(75) Inventors: Peter M. Eick, Houston, TX (US); Joel D. Brewer, Houston, TX (US); Shan Shan, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 13/028,007

(22) Filed: Feb. 15, 2011

(65) Prior Publication Data

US 2012/0037443 A1 Feb. 16, 2012

Related U.S. Application Data

(60) Provisional application No. 61/305,692, filed on Feb. 18, 2010, provisional application No. 61/305,689, filed on Feb. 18, 2010, provisional application No. 61/305,697, filed on Feb. 18, 2010.

(51) Int. Cl.
*G01V 1/047* (2006.01)
(52) U.S. Cl. ........................................ 181/121; 181/114
(58) Field of Classification Search .................. 181/114, 181/121
See application file for complete search history.

(56) References Cited

U.S. PATENT DOCUMENTS

| | | | |
|---|---|---|---|
| 3,106,982 A | 10/1963 | Wade | |
| 3,205,971 A * | 9/1965 | Clynch | ......................... 181/114 |
| 3,282,372 A | 11/1966 | Brown et al. | |
| 3,522,460 A | 8/1970 | Spurlin | |
| 3,866,709 A | 2/1975 | Mifsud | |
| 4,059,820 A | 11/1977 | Turpening | |
| 4,108,270 A | 8/1978 | Mifsud | |
| 4,116,299 A | 9/1978 | Martin | |
| 4,133,409 A | 1/1979 | Mifsud et al. | |
| 4,135,599 A | 1/1979 | Fair | |
| 4,147,228 A | 4/1979 | Bouyoucos | |
| 4,184,144 A | 1/1980 | Rickenbacker | |
| 4,253,538 A | 3/1981 | Weber et al. | |
| 4,298,086 A | 11/1981 | Pritchett | |

(Continued)

FOREIGN PATENT DOCUMENTS

CA 1147842 6/1983

(Continued)

OTHER PUBLICATIONS

European Patent Office, European Search Report, EP 11 15 4311.2, Jun. 7, 2011, 4 pages.

(Continued)

*Primary Examiner* — Jeremy Luks
(74) *Attorney, Agent, or Firm* — ConocoPhillips Company (57) ABSTRACT

Methods and systems are provided for inducing seismic energy waves in a subterranean formation. More particularly, improved seismic transducers are provided that comprise enhanced baseplates. Baseplates are provided that comprise an intermediate plate and a plurality of contact plates secured to the underside of the intermediate plate. The contact plates provide a surface area for engagement with the ground surface that is more limited than the lower surface area of the intermediate plate. Advantages of such baseplate enhancements include, but are not limited to, a reduction of baseplate harmonics or ringing and enhanced baseplate strength so as to reduce baseplate fatigue or failure, a reduction of baseplate flexure. These advantages ultimately translate to improved seismic surveys, having higher resolution of the formations surveyed and resulting in surveys reaching greater depths.

29 Claims, 4 Drawing Sheets

U.S. PATENT DOCUMENTS

| | | | |
|---|---|---|---|
| 4,406,345 A | 9/1983 | Fair | |
| 4,458,777 A | 7/1984 | Weber et al. | |
| 4,632,215 A | 12/1986 | Farris | |
| 4,639,905 A | 1/1987 | Goodloe | |
| 4,664,222 A | 5/1987 | Jones et al. | |
| 4,664,223 A | 5/1987 | Huizer et al. | |
| 4,676,337 A | 6/1987 | Martin | |
| 4,712,641 A | 12/1987 | Chelminski | |
| 4,750,157 A | 6/1988 | Shei | |
| 4,771,858 A * | 9/1988 | Goodloe | 181/114 |
| 4,782,446 A | 11/1988 | Ehler et al. | |
| 4,804,062 A | 2/1989 | Airhart | |
| 4,848,512 A * | 7/1989 | Airhart | 181/114 |
| 4,853,906 A | 8/1989 | Cole | |
| 4,875,544 A | 10/1989 | Airhart | |
| 5,483,026 A | 1/1996 | Hasbrouck et al. | |
| 6,065,562 A | 5/2000 | Bird et al. | |
| 6,381,544 B1 | 4/2002 | Sallas et al. | |
| 6,488,117 B1 | 12/2002 | Owen | |
| 6,561,310 B2 | 5/2003 | Hoover | |
| 6,612,397 B2 | 9/2003 | Sparrevik et al. | |
| 7,107,159 B2 | 9/2006 | German | |
| 7,327,633 B2 | 2/2008 | Bagaini et al. | |
| 7,841,444 B2 * | 11/2010 | Cannell et al. | 181/121 |
| 7,864,630 B2 | 1/2011 | Chiu et al. | |
| 2002/0149998 A1 | 10/2002 | Hoover | |
| 2007/0205042 A1 | 9/2007 | Temple et al. | |

FOREIGN PATENT DOCUMENTS

| | | |
|---|---|---|
| WO | 2009066047 | 5/2009 |

OTHER PUBLICATIONS

European Patent Office, Registered Letter, EP 11 154 311.2, Jul. 1, 2011, 5 pages.
U.S. Appl. No. 61/378,164, Eick.
U.S. Appl. No. 61/372,318, Eick.
U.S. Appl. No. 61/372,327, Eick.
U.S. Appl. No. 11/677,438, Eick.
"TRI-AX", Industrial Vehicles International, Inc., Oil & Gas, 1 page.
"Shear Wave Option", Industrial Vehicles International, Inc., Minivib, 1 page.
Michael Hall, "Analysis of Field Tests With an Improved Hydraulic Vibrator", ION Geophysical Corporation, 4 pages.
PCT Notification of Transmittal of the International Search Report and the Written Opinion of the International Searching Authority, or the Declaration, Apr. 12, 2011, 13 pages.

* cited by examiner

SEISMIC TRANSDUCERS HAVING REDUCED SURFACE AREA BASEPLATES AND METHODS OF USE

CROSS-REFERENCE TO RELATED APPLICATIONS

This application is a non-provisional application which claims the benefit of and priority to U.S. Provisional Application Ser. No. 61/305,692, filed Feb. 18, 2010, entitled "Seismic Transducers Having Reduced Surface Area Baseplates and Methods of Use", U.S. Provisional Application Ser. No. 61/305,689, filed Feb. 18, 2010, entitled "Seismic Transducers Having Improved Polygonal Baseplates and Methods of Use", and U.S. Provisional Application Ser. No. 61/305,697, filed Feb. 18, 2010, entitled "Seismic Transducers and Baseplates Having External Dampeners and Methods of Use", all disclosures of which are hereby incorporated by reference.

FIELD OF THE INVENTION

The present invention relates generally to methods and systems for inducing seismic vibrations into an elastic medium. More particularly, but not by way of limitation, embodiments of the present invention include methods and systems for inducing seismic vibrations into subterranean formations utilizing reduced surface area baseplates.

BACKGROUND

Various methods of geophysical exploration have been developed to aid in the determining the nature of subterranean formations for exploratory oil and gas drilling. Several surveying systems have been developed that utilize one or more vibratory energy sources to induce seismic waves that are directed into the ground and reflected back to the surface by different geological subsurface layers.

In these reflection-type seismic surveys, the reflected seismic waves are detected at the surface by a group of spaced apart receivers called geophones, accelerometers, seismometers or similar transducers. These transducers are collectively referred to as "geophones" herein following industry convention, but it is understood that they could be any sensor that converts seismic energy into some readable data. The reflected seismic waves detected by the geophones are analyzed and processed to generate seismic data representative of the nature and composition of the subterranean formation at various depths, including the nature and extent of hydrocarbon deposits. In this way, the seismic information collected by geophones can be used to produce seismic reflection signals which can be processed to form images of the subsurface.

It has become common in many cases to use, as the source of propagating elastic waves, a hydraulically-operated vibratory source more simply referred to as a vibrator. There are other forms of energy sources for vibrators like electromechanical or pure electric. All of these systems typically generate vibrations or shock waves by using a reaction mass member that is actuated by a hydraulic or electric system and electrically controlled by a servo valve. In a typical embodiment, a vibrator comprises a double ended piston rigidly affixed to a coaxial piston rod. The piston is located in reciprocating relationship in a cylinder formed within a heavy reaction mass. Means are included for alternately introducing hydraulic fluid under high pressure to opposite ends of the cylinder or for an electric coil and magnet type assembly to impart a reciprocating motion to the piston relative to the reaction mass. The piston rod extending from the reaction mass is rigidly coupled to a baseplate, which is maintained in intimate contact with ground surface. Since the inertia of the reaction mass tends to resist displacement of the reaction mass relative to the earth, the motion of the piston is coupled through the piston rod and baseplate to impart vibratory seismic energy in the earth.

Typically, vibrators are transported by carrier vehicle, and it is also known to prevent decoupling of the baseplate from the ground by applying a portion of the carrier vehicle's weight to the baseplate during operation. The weight of the carrier vehicle is frequently applied to the baseplate through one or more spring and stilt members, each having a large compliance, with the result that a static bias force is imposed on the baseplate, while the dynamic forces of the baseplate are decoupled from the carrier vehicle itself. In this way, the force from the vibrating mass is transferred through the baseplate into the earth at a desired vibration frequency. The hydraulic system forces the reaction mass to reciprocate vertically, at the desired vibration frequency, through a short vertical stroke.

This type of vibrational seismic exploration system typically uses a quasi-sinusoidal reference signal, or so-called pilot signal, of continuously varying frequency, selected band width, and selected duration to control the introduction of seismic waves into the earth. The pilot signal is converted into a mechanical vibration in a land vibrator having a baseplate which is coupled to the earth. The land vibrator is typically mounted on a carrier vehicle, which provides locomotion. During operation, the baseplate is contacted with the earth's surface and the weight of the carrier vehicle is applied to the baseplate. A servo-hydraulic piston connected to the baseplate is then excited by the pilot signal, causing vibration of the baseplate against the earth.

A significant problem with conventional systems employing a vibrating baseplate to impart seismic waves into the earth is that the actual motion of the baseplate, and thus the actual seismic energy imparted to the earth, is different from the ideal motion represented by the pilot signal. This difference can be caused by a variety of factors, including (1) harmonic distortion or "ringing" of the baseplate, (2) decoupling of the baseplate from the earth's surface commonly referred to as bouncing or "pogo-sticking," and (3) flexure of the baseplate. The differences between the pilot signal and the actual baseplate motion are problematic because, in the past, the pilot signal was used to pulse-compress the reflected seismic signal either through correlation or inversion. Thus, where the actual motion of the baseplate differs from the ideal motion corresponding to the pilot signal, the pulse-compressed reflected seismic signal that is produced by correlation or more modernly by inversion is inaccurate.

The data gathering and correlating portion of the various seismic exploration systems have been improved to the point that problems have been discovered with the performance of existing baseplates. These problems are related to the fact that baseplates have resonant frequencies and they also vibrate, both of which produce distortions in the generated energy signal. These distortions are carried completely through the process and detrimentally affect the geological information produced.

Accordingly, these deficiencies of conventional baseplates (e.g. harmonics, decoupling, and baseplate flexure) are problematic in that each of these problems contribute to producing a distorted seismic signal. Baseplate flexure is not only problematic from the standpoint of generating a distorted seismic signal, but it is also problematic, because flexure of the baseplate contributes to structural failure of the baseplate.

Accordingly, there is a need in the art for improved seismic vibrator assemblies and the baseplates thereof that address one or more disadvantages of the prior art.

SUMMARY

The present invention relates generally to methods and systems for inducing seismic vibrations into an elastic medium. More particularly, but not by way of limitation, embodiments of the present invention include methods and systems for inducing seismic vibrations into subterranean formations utilizing reduced surface area baseplates.

One example of a method for inducing seismic energy waves in a subterranean formation comprises the steps of: providing a seismic transducer apparatus comprising a frame, a baseplate comprising an intermediate plate and a plurality of contact plates, wherein the intermediate plate is attached to the frame, the intermediate plate having a lower intermediate plate surface, the lower intermediate plate surface having a lower intermediate plate surface area, wherein the plurality of contact plates is secured to the lower intermediate plate surface, the contact plates having a lower contact surface for engagement of a surface of an elastic medium, wherein the lower contact surface of each contact plate is substantially flat, each lower contact surface having a contact plate surface area, wherein the sum of the contact plate surface areas is at least about 25 percent to about 75 percent of the lower intermediate plate surface area, a reaction mass supported by the frame; and a driver configured to actuate the reaction mass in a reciprocating motion so as to impart vibratory energy to the baseplate; engaging the ground surface with the baseplate; actuating the reaction mass via the driver in a reciprocating motion; allowing vibratory energy to be imparted to the baseplate so as to propagate seismic energy waves in the subterranean formation; allowing the seismic energy waves to propagate through the subterranean formation so as to produce reflected and refracted seismic energy waves; and detecting one or more of the reflected and refracted seismic energy waves.

One example of a seismic transducer apparatus for inducing energy waves in an elastic medium comprises: a frame; a baseplate comprising an intermediate plate and a plurality of contact plates; wherein the intermediate plate is attached to the frame, the intermediate plate having a lower intermediate plate surface, the lower intermediate plate surface having a lower intermediate plate surface area; wherein the plurality of contact plates is secured to the lower intermediate plate surface, the contact plates having a lower contact surface for engagement of a surface of an elastic medium, wherein the lower contact surface of each contact plate is substantially flat, each lower contact surface having a contact plate surface area; wherein the sum of the contact plate surface areas is at least about 25 percent to about 75 percent of the lower intermediate plate surface area; a reaction mass supported by the frame; and a driver configured to actuate the reaction mass in a reciprocating motion so as to impart vibratory energy to the baseplate.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to methods and systems for inducing seismic vibrations into an elastic medium. More particularly, but not by way of limitation, embodiments of the present invention include methods and systems for inducing seismic vibrations into subterranean formations utilizing reduced surface area baseplates.

Methods and systems are provided for inducing seismic energy waves in a subterranean formation. In certain embodiments, seismic transducers in accordance with the present invention comprise a frame, a reaction mass supported by the frame, a driver, and a baseplate attached to the frame. The driver actuates the reaction mass in a reciprocating motion, imparting a vibratory energy to the baseplate. As the baseplate is engaged with a ground surface during operation, the vibratory energy of the baseplate is imparted directly to the ground surface so as to propagate seismic waves into the subterranean formation. The seismic waves are then reflected and refracted by the subsurface strata and geological features. The reflected and refracted seismic waves may then be detected by a plurality of seismic detectors. The detected seismic data is then interpreted to reveal seismic information representative of the surveyed subsea region of the earth.

In certain embodiments, baseplates of the present invention may comprise an intermediate plate and a plurality of contact plates secured to the underside of the intermediate plate. The contact plates provide a surface area for engagement with the ground surface that is more limited than the lower surface area of the intermediate plate. Advantages of such baseplate enhancements include, but are not limited to, a reduction of baseplate harmonics or ringing and enhanced baseplate strength so as to reduce baseplate fatigue or failure, a reduction of baseplate flexure. These advantages ultimately translate to improved seismic surveys, having higher resolution of the formations surveyed and resulting in surveys reaching greater depths.

Other baseplate enhancements are described further below and include, but are not limited to, contact plates having enhanced configurations such as contact plates having octagonal and hexagonal perimeters for example.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Figure 1:
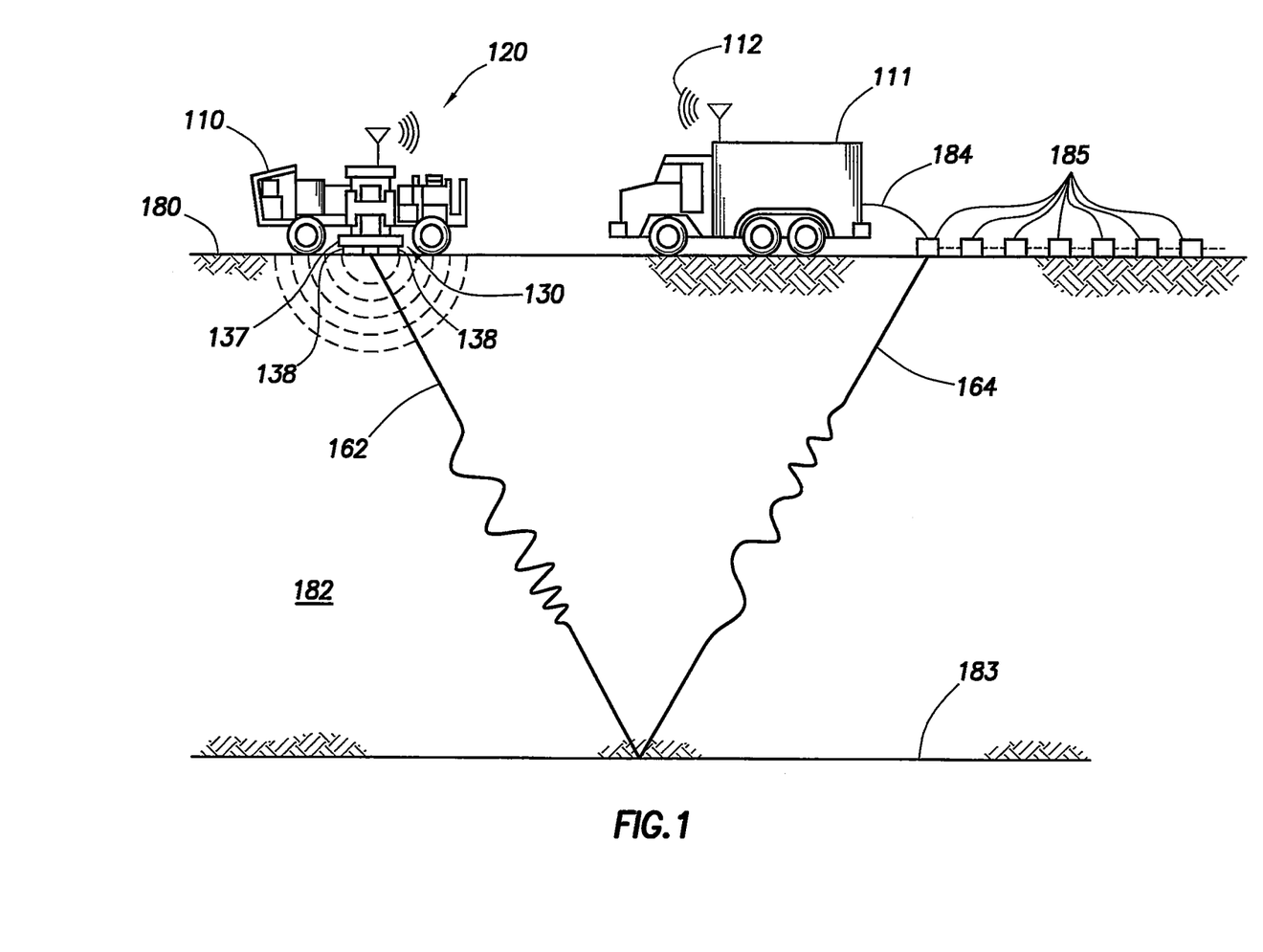
FIG. 1 illustrates a side view of one example of a seismic exploration system in accordance with one embodiment of the present invention.

FIG. 1 illustrates a side view of one example of a seismic exploration system in accordance with one embodiment of the present invention. A pilot signal is generated in recorder/processor carrier vehicle 111 and sent by radio wave link 112 to a land vibrator 120. Land vibrator 120 converts the pilot signal into mechanical motion that vibrates baseplate 130. Baseplate 130 comprises intermediate plate 137 and contact plates 138. Baseplate 130 contacts ground surface 180 of the earth via contact plates 138, and is further coupled to ground surface 180 by the weight of carrier vehicle 110. Baseplate 130 imparts induced seismic waves 162 into subsurface 182 of the earth. By reducing the surface area of baseplate 130 in contact with ground surface 180 to the surface area of contact plates 138, the distortion of seismic waves 162 is reduced.

Induced seismic wave 162 travels downward through subsurface 182 and is altered (i.e., refracted and/or reflected) by subsurface strata 183. Altered seismic waves 164 travels from subsurface strata 183 upward through subsurface 182 to surface 180. Seismic receivers 185, such as geophones, located on surface 180, are generally spaced apart from each other and from land vibrator 120. Seismic receivers 185 measure altered seismic waves 164 at surface 180 and transmit an altered seismic signal indicating altered seismic wave 28 across geophone lines 184 to recorder/processor carrier vehicle 110. This communication may be accomplished via wires conventionally, or with autonomous recorders where the data is later collected and transcribed to the recording media. A baseplate signal is transmitted from land vibrator 120 via radio wave link 112 to recorder/processor carrier vehicle 110 for processing. In this way, seismic survey data is collected and interpreted so as to reveal the nature and the geology of subterranean formation 182.

Figure 2:
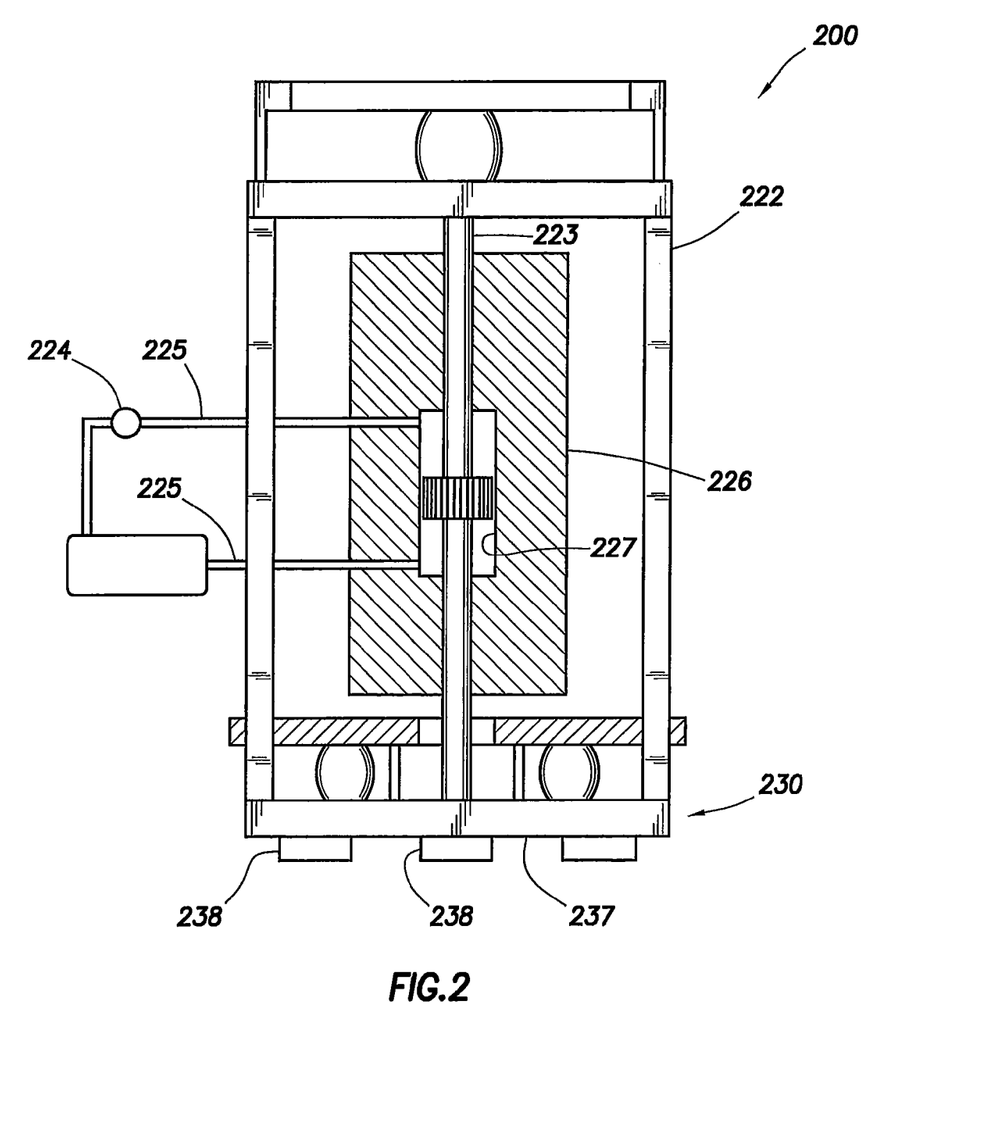
FIG. 2 illustrates a side view of one example of a seismic transducer in accordance with one embodiment of the present invention.

FIG. 2 illustrates a side view of one example of a seismic transducer in accordance with one embodiment of the present invention. Seismic transducer apparatus 200 utilizes a reciprocating motion of reaction mass 225 to impart vibratory energy to baseplate 230. Baseplate 230 comprises intermediate plate 237 and contact plates 238. Contact plates are secured to the underside of intermediate plate 237 and act to reduce the surface area in contact with the ground surface (not shown). Reducing the surface area of baseplate 230 in contact with the ground surface is advantageous in that the distortion of the induced seismic waves is minimized. Reduction of this surface area in contact with the earth also minimizes the aforementioned problems of baseplate ringing, harmonics, flexure, and decoupling.

Frame 222 supports and is rigidly connected to piston rod 223 and baseplate 230. Driver 224 pumps or otherwise supplies hydraulic fluid to hydraulic cylinder 227 through ports 225. In this way, driver 224 actuates reaction mass 226 about piston rod 223. When vibrations are induced by controlled hydraulic fluid flow into and from cylinder 227, reciprocating motion of reaction mass 226 is generated about piston rod 223. As reaction mass 226 is supported by frame 222, this reciprocating motion is transmitted to baseplate 230 via the inertia of reaction mass 226. The term, "supported," as used herein, explicitly includes being indirectly supported by frame 222, for example, by hydraulic fluid in hydraulic cylinder 227. In this way, vibratory energy is imparted to baseplate 230 corresponding to the motion of reaction mass 226. Baseplate 230 then transmits the vibratory energy to a ground surface (such as ground surface 180 depicted in FIG. 1) via a flat lower surface of contact plates 238. As described further below, baseplate 230 may further comprise one or more additional improvements for producing an enhanced baseplate.

Figure 3A:
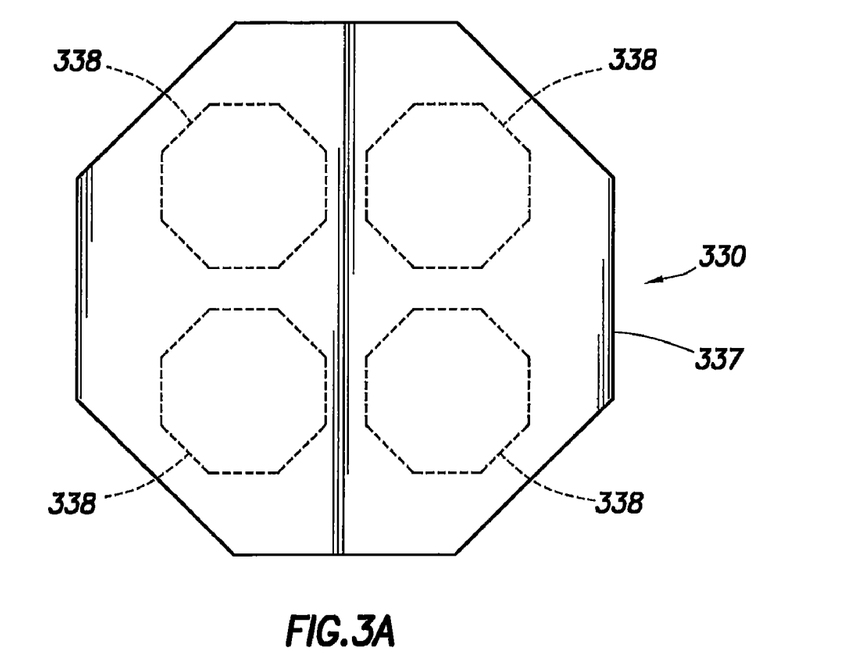
FIG. 3A illustrates a top view of an octagonal baseplate in accordance with one embodiment of the present invention.

FIG. 3A illustrates a top view of an octagonal baseplate in accordance with one embodiment of the present invention. In certain embodiments, the perimeter of intermediate plate 337 forms the shape of a polygon, having n sides, where n may be any integer greater than or equal to 4. In certain embodiments, n is greater than or equal to 5. In the example depicted in FIG. 3A, the perimeter of intermediate plate 337 is formed in the shape of an octagon. Although baseplate 330 depicted in FIG. 3A is shown here as an equilateral polygon, it is recognized that perimeter 333 of baseplate 330 may form an irregular polygon.

The octagonal shape of the perimeter of intermediate plate 337 reduces some of the problems experienced by conventional baseplates. Additionally, the octagonal shape of intermediate plate 337 reduces the weight of baseplate 330 relative to a conventional rectangular or circular baseplate, resulting in a more responsive baseplate.

Likewise, the perimeter of each contact plate 338 may be formed the shape of a polygon, having n sides, where n may be any integer greater than or equal to 4. In the example depicted in FIG. 3A, the perimeter of contact plates 338 is in the shape of an octagon. Although the perimeter of contact plates 338 depicted in FIG. 3A is shown here as equilateral polygons, it is recognized that the perimeter of contact plates 338 may be formed in the shape of any irregular polygon. Alternatively, contact plates 338 may be formed with a perimeter of any shape, regular or irregular, including, but not limited to, circular, square, rectangular, or otherwise. In certain embodiments, contact plates 338 are formed in the shape of a polyhedron, having a flat upper surface. Where contact plates 538 are formed in the shape of blocks, contact plates 538 may have a height of about 1 inch to about 3 inches, a width of about 6 inches to about 2 feet, and a length of about 6 inches to about 4 feet in certain embodiments. Where contact plates 538 have a circular perimeter, the circular perimeter may vary from about 6 inches to about 4 feet in certain embodiments.

Figure 3B:
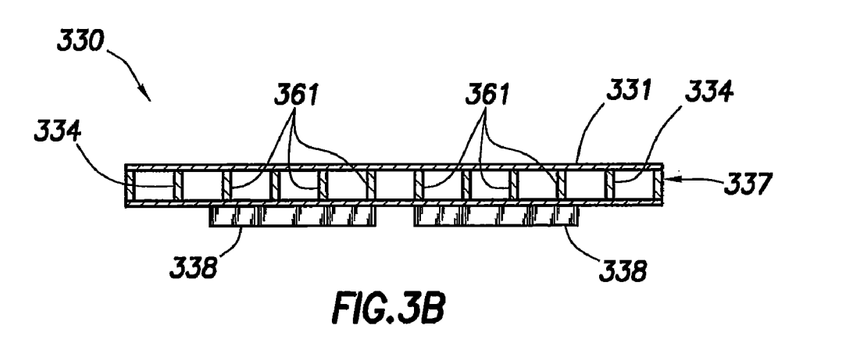
FIG. 3B illustrates a side view of an octagonal baseplate in accordance with one embodiment of the present invention.

FIG. 3B illustrates a side view of an octagonal baseplate in accordance with one embodiment of the present invention. Baseplate 330 comprises intermediate plate 337 and plurality of contact plates 338. Intermediate plate 337, in turn, comprises upper plate 331, lower plate 332, and plurality of walls 334. Walls 334 extend between upper plate 331 and lower plate 332 so as to join or otherwise couple upper plate 331 to lower plate 332. In certain embodiments, upper plate 331, lower plate 332, and plurality of walls 334 are formed as one integral unit, such as, being cast from a one or more dies or molds.

In the embodiment depicted here, contact plates 338 are situated under plurality of reinforced nodes 361. Reinforced nodes 361 are points or any portion of intermediate plate 337 that is strengthened or further reinforced by support or buttressing members such as I-beams or as in this case, walls 334.

Forming intermediate plate 337 from a solid steel baseplate structure could impose a severe weight penalty on the vibrating mechanism. The alternate structure depicted in FIG. 3B however provides a much lighter weight baseplate while preserving a relatively reinforced structure resistant to flexure and fatigue failures. In this way, intermediate plate 337 may be maintained within acceptable weight limitations and yet be capable of withstanding large forces generated by a seismic transducer.

Figure 4A:
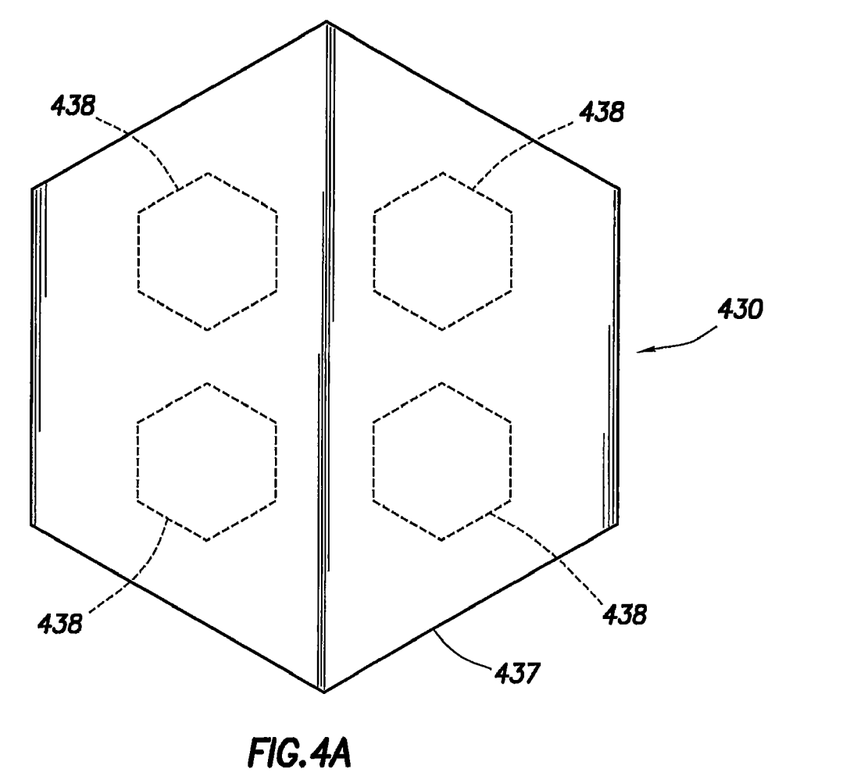
FIG. 4A illustrates a top view of a hexagonal baseplate in accordance with one embodiment of the present invention.

FIG. 4A illustrates a top view of a hexagonal baseplate in accordance with one embodiment of the present invention. Here, the perimeter of intermediate plate 437 is shown in the shape of a hexagon, although it is recognized that intermediate plate 437 may be formed in any shape, regular or irregular, including, but not limited to, circular, square, rectangular, or otherwise. As before, plurality of contact plates 438 may be secured to the underside of intermediate plate 437. The surface area of the lower surface of contact plates 438 may be reduced as compared to the surface area of the lower surface of intermediate plate 437. In certain embodiments, the sum of the surface area of the lower surfaces of contact plates 438 is less than about 25 percent to about 75 percent of the surface area of the lower surface of intermediate plate 437. In other embodiments, the sum of the surface area of the lower surfaces of contact plates 438 is less than about 50 percent to about 75 percent of the surface area of the lower surface of intermediate plate 437.

The enhancements described herein with respect to baseplate 430 allow seismic transducers that incorporate baseplate 430 to operate at higher seismic frequencies ranges without producing substantial signal distortion or noise. In certain embodiments, seismic transducers of the present invention operate at frequency ranges extending into the higher seismic frequency range of at least about 50 cycles per second, at least about 150 cycles per second, and/or at least about 250 cycles per second.

Figure 4B:
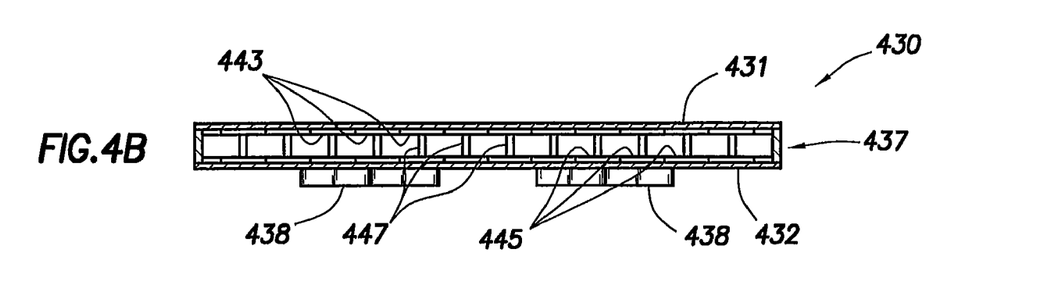
FIG. 4B illustrates a side view of a hexagonal baseplate in accordance with one embodiment of the present invention.

FIG. 4B illustrates a side view of a hexagonal baseplate in accordance with one embodiment of the present invention. Baseplate 430 comprises intermediate plate 437 and plurality of contact plates 438. As before, contact plates 438 are secured to the underside of intermediate plate 437.

Intermediate plate 437, in turn, comprises upper plate 431 and lower plate 432, which, here, are in the shape of a polygon and more specifically, in the shape of a hexagon. It is recognized that the perimeter of upper plate 431 and/or lower plate 432 may take the form of a polygonal shape. In certain embodiments, only lower plate 432 takes the form of a polygon. Here, intermediate plate 437 is fabricated from a plurality of parallel steel I-beams. Each I-beam is formed from an upper flange 443, a lower flange 445, and a web 347 that joins upper flange 443 to lower flange 445. The longitudinal axes of the I-beams are located parallel to one another and adjacent I-beams are oriented so the edges of their upper and lower flanges are abutting (the webs of the I-beams lie in vertical planes). The I-beam flanges may be welded together so as to provide a unitary structure, which may be further reinforced by optional upper and lower reinforcing plates 431 and 432. It will be appreciated that this type of structure provides great resistance to stress exerted along the longitudinal axis of the I-beams, yet would be substantially lighter than a solid cast plate.

In certain embodiments, contact plates 438 are detachable from intermediate plate 437.

Figure 5:
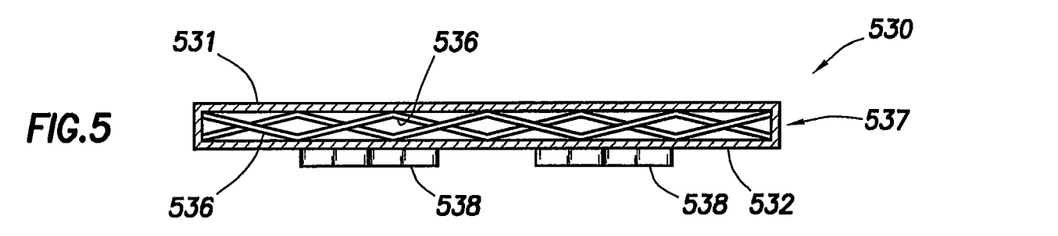
FIG. 5 illustrates a side view of a baseplate having a plurality of truss members in accordance with one embodiment of the present invention.

FIG. 5 illustrates a side view of a baseplate having a plurality of truss members in accordance with one embodiment of the present invention. Baseplate 530 comprises intermediate plate 537 and contact plates 538. Contact plates 538 may be formed in the shape of blocks as shown here. As before, contact plates 538 comprise a reduced lower surface area as compared to the lower surface area associated with intermediate plate 537. Contact plates 538 may be comprised of a solid material or may comprise any of the aforementioned truss and/or web reinforcing features disclosed herein.

Contact plates 538 may be secured to the lower surface of intermediate plate 537 by any manner known in the art for affixing a contact plate to a baseplate, including but not limited to, using welding, screws, bolts, or any combination thereof.

Intermediate plate 537, in turn, comprises upper plate 531, lower plate 532, and plurality of truss members 536. Truss members 536 extend between upper plate 531 and lower plate 532 so as to join or otherwise couple upper plate 531 to lower plate 532.

It is recognized that either upper plate 531 or lower plate 532 may be formed in the shape of the aforementioned polygons. Alternatively, both upper plate 531 and lower plate 532 may be formed in the shape of the aforementioned polygons.

It is explicitly recognized that any of the elements and features of each of the devices described herein are capable of use with any of the other devices described herein with no limitation. Furthermore, it is explicitly recognized that the steps of the methods herein may be performed in any order except unless explicitly stated otherwise or inherently required otherwise by the particular method.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention.

What is claimed is:

1. A method for inducing seismic energy waves in a subterranean formation comprising the steps of:
providing a seismic transducer apparatus comprising a frame, a baseplate comprising an intermediate plate and a plurality of contact plates, wherein the intermediate plate is attached to the frame, the intermediate plate having a lower intermediate plate surface, the lower intermediate plate surface having a lower intermediate plate surface area, wherein the plurality of contact plates is secured to the lower intermediate plate surface, the contact plates having a lower contact surface for engagement of a surface of an elastic medium, wherein the lower contact surface of each contact plate is substantially flat, each lower contact surface having a contact plate surface area, wherein the sum of the contact plate surface areas is at least about 25 percent to about 75 percent of the lower intermediate plate surface area, a reaction mass supported by the frame; and a driver configured to actuate the reaction mass in a reciprocating motion so as to impart vibratory energy to the baseplate;
engaging the ground surface with the plurality of contact plates wherein said contact plates provide a reduced surface area for engagement with a ground surface that is more limited than the lower surface area of the intermediate plate;

actuating the reaction mass via the driver in a reciprocating motion;

allowing vibratory energy to be imparted to the plurality of contact plates so as to propagate seismic energy waves in the subterranean formation wherein the contact plates reduced surface area minimizes baseplate ringing, harmonics, flexure, and decoupling thereby reducing distortion of seismic energy waves;

allowing the seismic energy waves to propagate through the subterranean formation so as to produce reflected and refracted seismic energy waves; and detecting one or more of the reflected and refracted seismic energy waves.

2. The method of claim 1 further comprising the step of actuating the reaction mass at an operating frequency range extending into a higher seismic frequency range above about 50 cycles per second.

3. The method of claim 2 further comprising the step of actuating the reaction mass at an operating frequency range extending into the higher seismic frequency range above about 150 cycles per second.

4. The method of claim 1 further comprising the step of actuating the reaction mass over a frequency sweep that includes one or more operating frequencies extending into a higher seismic frequency range above about 250 cycles per second.

5. The method of claim 1 wherein each contact plate is a block.

6. The method of claim 1 wherein each contact plate is a polyhedron having a flat upper surface.

7. The method of claim 6 wherein the polyhedron has a perimeter wherein the perimeter forms a polygon.

8. The method of claim 7 wherein the polygon comprises at least 5 sides.

9. The method of claim 8 wherein the polygon is an octagon.

10. The method of claim 9 wherein the octagon is equilateral.

11. The method of claim 1 wherein the contact plates are detachable from the intermediate plate.

12. The method of claim 1 wherein the contact plates are integral to the intermediate plate such that the contact plates and the intermediate plate form one unitary structure.

13. The method of claim 1 wherein the intermediate plate comprises a plurality of reinforced nodes, wherein each contact plate is situated under one of the reinforced nodes.

14. The method of claim 1 wherein the sum of the contact plate surface areas is at least about 50 percent of the lower intermediate plate surface area.

15. The seismic transducer apparatus of claim 1 wherein the sum of the contact plate surface areas is at least about 75 percent of the lower intermediate plate surface area.

16. A seismic transducer apparatus for inducing energy waves in an elastic medium comprising:
a frame;
a baseplate comprising an intermediate plate and a plurality of contact plates;
wherein the intermediate plate is attached to the frame, the intermediate plate having a lower intermediate plate surface, the lower intermediate plate surface having a lower intermediate plate surface area;
wherein the plurality of contact plates is secured to the lower intermediate plate surface, the contact plates having a lower contact surface for engagement of a surface of an elastic medium, wherein the lower contact surface of each contact plate is substantially flat, each lower contact surface having a contact plate surface area;
wherein the sum of the contact plate surface areas is at least about 25 percent to about 75 percent of the lower intermediate plate surface area;
a reaction mass supported by the frame; and
a driver configured to actuate the reaction mass in a reciprocating motion so as to impart vibratory energy to the plurality of contact plates wherein said contact plates provide a reduced surface area for engagement with the ground surface that is more limited than the lower surface area of the intermediate plate and the reduced surface area minimizes baseplate ringing, harmonics, flexure, and decoupling thereby reducing distortion of seismic energy waves.

17. The seismic transducer apparatus of claim 16 wherein each contact plate is a block.

18. The seismic transducer apparatus of claim 16 wherein each contact plate is a polyhedron having a flat upper surface.

19. The seismic transducer apparatus of claim 18 wherein the polyhedron has a perimeter wherein the perimeter forms a polygon.

20. The seismic transducer apparatus of claim 19 wherein the polygon comprises at least 5 sides.

21. The seismic transducer apparatus of claim 20 wherein the polygon is an octagon.

22. The seismic transducer apparatus of claim 21 wherein the octagon is equilateral.

23. The seismic transducer apparatus of claim 16 wherein the contact plates are detachable from the intermediate plate.

24. The seismic transducer apparatus of claim 16 wherein the contact plates are integral to the intermediate plate such that the contact plates and the intermediate plate form one unitary structure.

25. The seismic transducer apparatus of claim 16 wherein the intermediate plate comprises a plurality of reinforced nodes, wherein each contact plate is situated under one of the reinforced nodes.

26. The seismic transducer apparatus of claim 16 wherein the sum of the contact plate surface areas is at least about 50 percent of the lower intermediate plate surface area.

27. The seismic transducer apparatus of claim 26 wherein the sum of the contact plate surface areas is at least about 75 percent of the lower intermediate plate surface area.

28. The seismic transducer apparatus of claim 17 wherein each block has a height of about 1 inch to about 3 inches, a width of about 6 inches to about 2 feet, and a length of about 6 inches to about 4 feet.

29. The seismic transducer apparatus of claim 16 wherein each contact plate has a circular perimeter and wherein the circular perimeter has a diameter from about 6 inches to about 4 feet.

* * * * *